(12) United States Patent
MacKenzie et al.

(10) Patent No.: US 10,863,360 B2
(45) Date of Patent: Dec. 8, 2020

(54) CELLULAR TELECOMMUNICATIONS NETWORK

(71) Applicant: British Telecommunications Public Limited Company, London (GB)

(72) Inventors: Richard Thomas MacKenzie, London (GB); Keith Briggs, London (GB)

(73) Assignee: British Telecommunications Public Limited Company, London (GB)

( * ) Notice: Subject to any disclaimer, the term of this patent is extended or adjusted under 35 U.S.C. 154(b) by 148 days.

(21) Appl. No.: 16/023,917

(22) Filed: Jun. 29, 2018

(65) Prior Publication Data
US 2019/0014478 A1  Jan. 10, 2019

(30) Foreign Application Priority Data

Jul. 7, 2017 (EP) ..................................... 17180358

(51) Int. Cl.
*H04W 16/02* (2009.01)
*H04W 24/04* (2009.01)
(Continued)

(52) U.S. Cl.
CPC ........... *H04W 16/02* (2013.01); *H04W 24/02* (2013.01); *H04W 24/04* (2013.01); *H04W 16/10* (2013.01); *H04W 16/18* (2013.01)

(58) Field of Classification Search
None
See application file for complete search history.

(56) References Cited

U.S. PATENT DOCUMENTS 8,903,402 B2  12/2014  Guo et al.
9,215,629 B2  12/2015  Hapsari et al.
(Continued)

FOREIGN PATENT DOCUMENTS

CN  105611554 A   5/2016
EP  2 154 917 A1  2/2010
(Continued)

OTHER PUBLICATIONS

NGNM the engine of broadband wireless innovation "Recommended Practices for multi-vendor SON deployment" Deliverable D2 Version 1.0 by NGNM Alliance; Reading Bridge House George Street Reading Berkshire RG1 8LS UK; Jan. 28, 2014; 30 pages.
(Continued)

*Primary Examiner* — James P Duffy

(57) ABSTRACT

A method of operating a cellular telecommunications network having a plurality of base stations, wherein each base station of the plurality of base stations has an operational parameter being one of a set of values, wherein the set includes k values, the method including defining a first graph comprising a first plurality of nodes and a first plurality of edges, wherein a node of the first plurality of nodes represents a first base station of the plurality of base stations, and an edge of the first plurality of edges represents a first neighboring relationship between two base stations of the plurality of base stations, wherein each edge of the first plurality of edges has an associated first weight value; partitioning the first graph into k sub-first graphs, each having a first subset of the plurality of nodes and a first subset of the plurality of edges, such as to minimize a first sum value of the first weight values of the first subset of the plurality of edges in all k sub-first graphs; calculating a first conflict value for the k sub-first graphs based on the first sum value; determining whether to initiate a change relating to the operating parameter to one or more base stations in the plurality of base stations based on the first conflict value.

13 Claims, 6 Drawing Sheets

(51) Int. Cl.
*H04W 24/02* (2009.01)
*H04W 16/18* (2009.01)
*H04W 16/10* (2009.01)

(56) References Cited

U.S. PATENT DOCUMENTS

| | | | |
|---|---|---|---|
| 9,301,105 | B2 | 3/2016 | Kim et al. |
| 9,392,420 | B2 | 7/2016 | Fodor et al. |
| 9,439,137 | B2 | 9/2016 | Kim et al. |
| 10,194,474 | B2 | 1/2019 | Fitch et al. |
| 2009/0003260 | A1* | 1/2009 | Guo .................. H04W 16/02 370/315 |
| 2010/0120447 | A1 | 5/2010 | Anderson et al. |
| 2010/0157911 | A1 | 6/2010 | Hedge et al. |
| 2010/0178912 | A1 | 7/2010 | Gunnarsson et al. |
| 2011/0190027 | A1 | 8/2011 | Michel et al. |
| 2011/0274030 | A1 | 11/2011 | Wang et al. |
| 2012/0002537 | A1 | 1/2012 | Bao et al. |
| 2012/0026865 | A1 | 2/2012 | Fan et al. |
| 2012/0157095 | A1 | 6/2012 | Fodor et al. |
| 2012/0236828 | A1 | 9/2012 | Hapsari et al. |
| 2012/0257495 | A1 | 10/2012 | Schwarz et al. |
| 2012/0264418 | A1 | 10/2012 | Lee et al. |
| 2012/0275315 | A1 | 11/2012 | Schlangen et al. |
| 2013/0005340 | A1 | 1/2013 | Drazynski et al. |
| 2013/0035033 | A1 | 2/2013 | Sanneck et al. |
| 2013/0084873 | A1 | 4/2013 | Sharony et al. |
| 2013/0260768 | A1 | 10/2013 | Guo et al. |
| 2014/0038593 | A1 | 2/2014 | Kim |
| 2014/0071891 | A1 | 3/2014 | Zhou et al. |
| 2014/0092765 | A1 | 4/2014 | Agarwal et al. |
| 2014/0187236 | A1 | 7/2014 | Chiang et al. |
| 2014/0269547 | A1 | 9/2014 | Valliappan et al. |
| 2015/0063136 | A1 | 3/2015 | Shen et al. |
| 2015/0092552 | A1 | 4/2015 | Bajj et al. |
| 2015/0131524 | A1 | 5/2015 | Cavalcante et al. |
| 2015/0271714 | A1 | 9/2015 | Shetigar et al. |
| 2015/0358940 | A1 | 12/2015 | Zhang et al. |
| 2016/0192177 | A1 | 6/2016 | Kim et al. |
| 2017/0086181 | A1 | 3/2017 | Briggs |
| 2017/0303188 | A1 | 10/2017 | Fitch et al. |
| 2018/0262922 | A1 | 9/2018 | MacKenzie et al. |

FOREIGN PATENT DOCUMENTS

| | | |
|---|---|---|
| EP | 2 271 142 A1 | 1/2011 |
| EP | 2 814 279 A1 | 12/2014 |
| WO | WO 2009/022976 A1 | 2/2009 |
| WO | WO 2010/024743 A1 | 3/2010 |
| WO | WO 2011/028158 A1 | 3/2011 |
| WO | WO 2011/056023 A2 | 5/2011 |
| WO | WO 2012/138125 A2 | 10/2012 |
| WO | WO 2013/071813 A1 | 5/2013 |
| WO | WO 2013/120274 A1 | 8/2013 |
| WO | WO 2013/142361 A1 | 9/2013 |
| WO | WO 2015/034775 A1 | 3/2015 |
| WO | WO 2017/148752 A1 | 9/2017 |
| WO | WO 2017/157585 A1 | 9/2017 |

OTHER PUBLICATIONS

Small Cell Forum Release 9.0; Document 176.09.01 LTE small cell SON test cases: Functionality and interworking; version 176.09.01; Feb. 21, 2017; 95 pages.
Fairbrother et al., "A Two-Level Graph Partitioning Problem Arising in Mobile Wireless Communications"; arXiv:1705.08773v1 [math.OC] May 24, 2017; 23 pages.
Web article, "DSDP", NEOS Interfaces to DSDP http://www.mcs.anl.gov/DSDP; retrieved Jul. 3, 2017; 4 pages.
Web article, "Welcome to CVXPY" Welcome to CVXPY—CVXPY 0.4.9.documentation, retrieved Jul. 3, 2017; http://www.cvxpy.org/en/latest; 1 page.
Ghaddar et al., "A branch-and-cut algorithm based on semidefinite programming for the minimum k-parition problem"; Ann Oper Res DOI 10 1007/s10479-008-0481-4; Springer Science+Business Media, LLC 2008; Published online Dec. 3, 2008; 20 pages.
Rendl, F., "Semidefinite Relaxations for Partitioning, Assignment and Ordering Problems"; Cross Mark, Ann Oper Res (2016) 240 119-140 DOI 10 1007/s10479-015-2015-1; Published online Sep. 15, 2015; Springer Science+Business Media New York 2015; 22 pages.
Carlson et al., "Scheduling to Minimize Interaction Cost"; The Johns Hopkins University, Baltimore, Maryland; Jun. 2, 1965; 8 pages.
Ning et al., "Fuzzy layered physical cell identities assignment in heterogeneous and small cell networks"; Electronics Letters May 12, 2016, vol. 52 No. 10, pp. 879-881; 2 pages.
European Search Report for corresponding EP Application No. 17180358.8; dated Jan. 31, 2018; 5 pages.
GB Search and Examination Report for GB Application No. GB1710989.3; dated Dec. 1, 2017; 5 pages.
Application and Filing Receipt for U.S. Appl. No. 15/516,765, filed Apr. 4, 2017, Inventor(s): Fitch et al.
Application and Filing Receipt for U.S. Appl. No. 15/553,708, filed Aug. 25, 2017, Inventor(s): Fitch et al.
Application and Filing Receipt for U.S. Appl. No. 15/762,022, filed Mar. 21, 2018, Inventor(s): MacKenzie et al.
Written Opinion of the International Preliminary Examining Authority for International Application No. PCT/US2015/076524 dated May 26, 2016; 7 pages.
International Preliminary Report on Patentability from the International Preliminary Examining Authority for International Application No. PCT/US2015/076524 report completed on Mar. 7, 2017; 11 pages.
Motorola et al., "Draft CR capturing HeNB inbound mobility agreements," 3GPP Draft; R2-096401 CR HENB 36_300 Agreements V7, $3^{rd}$ Generation Partnership Project (3GPP), Jeju, Korea (Nov. 9, 2009); 4 pages. XP050391033.
Qualcomm Europe, "QoS support for hybrid CSG cells," 3GPP Draft; R3-091454, $3^{rd}$ Generation Partnership Project (3GPP), San Francisco, US (May 4, 2009); 3 pages. XP050341776.
Qualcomm Europe et al., "QoS principles for CSG members and non-members at hybrid access mode HeNBs," 3GPP Draft; R3-091022, $3^{rd}$ Generation Partnership Project (3GPP), San Francisco, US (Apr. 29, 2009); 4 pages. XP050341407.
Extended European Search Report for EP Application No. 14194204.5 dated Jul. 23, 2015; 7 pages.
International Search Report for International Application No. PCT/US2015/076524 dated Dec. 21, 2015; 4 pages.
Wu et al., Hai Jiang Yi; "Physical Cell Identity Self-Organization for Home eNodeB Deployment in LTE"; Nokia Siemens Networks; 978-1-4244-3709-2/10; 2010 IEEE; Beijing China; 6 pages.
International Search Report and the Written Opinion of the International Searching Authority for PCT Application No. PCT/EP2016/069745, dated Nov. 11, 2016, 11 pages.
International Preliminary Report on Patentability for PCT Application No. PCT/EP2017/052738 dated Jun. 22, 2018; 27 pages.
International Search Report and Written Opinion for PCT Application No. PCT/EP2017/052738 dated Mar. 27, 2017; 20 pages.
European Search Report for EP Application No. 16160809.6 dated Sep. 26, 2016; 14 pages.
UK Examination Report for GB Patent Application No. GB1604515.5, dated May 11, 2017, 1 pages.
UK Examination Report for GB Patent Application No. GB1604515.5, dated Jan. 31, 2018, 3 pages.
UK Intention to Grant for GB Patent Application No. GB1604515.5, dated May 11, 2018, 2 pages.
UK Combined Search and Examination Report for GB Patent Application No. GB1604515.5, dated Sep. 9, 2016, 3 pages.
Younis, et al.; Military Communications; "Cognitive MANET Design for Mission-Critical Networks", IEEE Communications Magazine, Oct. 2009; 0163-6804/09 2009 IEEE; 5 pages.
$3^{rd}$ Generation Partnership Project; Technical Specification Group Services and System Aspects; Telecommunication Management; "Study on Management of Evolved Universal Terrestrial Radio

(56) References Cited

OTHER PUBLICATIONS

Access Network (E-UTRAN) and Evolved Packet Core (EPC)"; Release 8 3GPP TR 32.816 V8.0.0 (Dec. 2008) Technical Report; Valbonne—France; 38 pages.

Qualcomm Technologies, Inc,; "LTE Small Cell SON Test Cases Functionality and Interworking"; Jun. 5, 2015; Qualcomm Technologies, Inc. 5775 Morehouse Drive San Diego, CA 92121 U.S.A.; 82 pages.

International Search Report and Written Opinion for PCT Application No. PCT/EP2017/053957 dated Jul. 23, 2017; 11 pages.

European Search Report for EP Application No. 16158665.6 dated Sep. 13, 2016; 6 pages.

GB Combined Search and Examination Report for GB Application No. GB1603748.3; dated Aug. 26, 2016; 6 pages.

Mukhopadhyay et al.; "Novel RSSI Evaluation Models for Accurate Indoor Localization with Sensor Networks"; 978-1-4799-2361-8/14; 2014 IEEE; Bharti School of Telecommunication Technology and Management IIT Delhi Hauz Khas, New Delhi; 6 pages.

3rd Generation Partnership Project; Technical Specification Group Radio Access Network; Evolved Universal Terrestrial Radio Access (E-UTRA); Radio Frequency (RF) system scenarios (Release 9) 3GPP TR 36.942 V9.3.0 (Jun. 2012); 83 pages.

Macqueen, J. "Some Methods for Classification and Analysis of Multivariate Observations"; Fifth Berkeley Symposium; University of California, Los Angeles (1967). pp. 281-297 (17 pages total).

EP Search Report for EP Application No. 15187067.2; dated Mar. 18, 2016; 8 pages.

GB Examination Report for GB Application No. 1517069.9; dated Jan. 31, 2018; 3 pages.

GB Search Report for GB Application No. 1517069.9; dated Mar. 7, 2016; 4 pages.

International Preliminary Report on Patentability for PCT Application No. PCT/EP2016/069745, dated Oct. 20, 2017, 14 pages.

Application and Filing Receipt for U.S. Appl. No. 16/082,870, filed Sep. 6, 2018, Inventor(s): MacKenzie et al.

Application and Filing Receipt for U.S. Appl. No. 16/079,327, filed Aug. 23, 2016, Inventor(s): Briggs et al.

\* cited by examiner

CELLULAR TELECOMMUNICATIONS NETWORK

CROSS-REFERENCE TO RELATED APPLICATION

The present application claims priority to EP Application No. 17180358.8 filed Jul. 7, 2017, which is hereby incorporated herein in its entirety by reference.

TECHNICAL FIELD

The present disclosure relates to a cellular telecommunications network and a method of operating the same.

BACKGROUND

A cellular telecommunications network includes a plurality of base stations which each serve a plurality of User Equipment (UE) within the base station's coverage area (known as a "cell"). The base station must operate within defined sets of operating parameters, such as transmission power, Physical Cell Identifier (PCI), or Inter-Cell Interference Coordination (ICIC) resource assignment. The selection of a particular operating parameter from each set of operating parameters has a significant impact on the overall performance of the cellular network due to the likelihood of interference should any two base stations have conflicting values for a particular operating parameter (e.g. two neighboring base stations having the same PCI value, such that a UE or other neighboring base station cannot discern between their transmissions without the further computational burden of decoding a unique identifier, such as the E-UTRAN Cell Global Identifier (ECGI)).

In recent years, Heterogeneous Networks (HetNets) have become an increasingly popular solution to the growing demand for cellular networking services. HetNets include a number of different base stations which are of different forms, such as macro base stations and the various base stations which are generally referred to as "small cells" (such as femto base stations, pico base stations, metro base stations and micro base stations). Prior to the introduction of HetNets, cellular network operators were able to pre-plan the location and operating parameters of each macro base station in order to minimize any operating parameter conflict (and therefore maximize performance). However, the small cells of HetNets are often deployed in an ad-hoc manner (for example, by being positioned by the end-user and having its operating parameters selected by Self-Organizing Network (SON) algorithms, which may differ between network operators), such that the likelihood of operating parameter conflict increases.

Another technique employed by cellular network operators is that of "pooling," in which a set of operating parameters are divided into subsets which are designated to a particular group of base stations. An example of this technique is PCI pooling, in which the set of 504 PCI values are divided into subsets, and a particular group of base stations (such as a group associated with a particular operator, or a group associated with a particular transmission range) must use one of those subsets. This can be useful for the base station's SON algorithms, as certain characteristics of their neighbors can be determined simply by decoding their PCIs. However, the reduction in size of the set of operating parameters available to a group of base stations increases the likelihood of neighboring base stations having conflicting operating parameters.

Accordingly, an operator of a cellular network having a plurality of such pools is presented with an optimization problem for the size of each subset of operating parameters for each pool. That is, as a subset for one pool increases, the likelihood of a conflict within that pool decreases. However, an increase in a subset for one pool typically results in a reduction in a subset for another pool, such that the likelihood of a conflict in the other pool may increase. A further problem is known in that any change in the subset for a pool may require a period of service interruption whilst each base station (and its connected UEs) reconfigure.

It is therefore desirable to alleviate some or all of the above problems.

SUMMARY

According to a first aspect of the disclosure, there is provided a method of operating a cellular telecommunications network comprising a plurality of base stations, wherein each base station of the plurality of base stations has an operational parameter being one of a set of values, wherein the set includes k values, the method comprising: defining a first graph comprising a first plurality of nodes and a first plurality of edges, wherein a node of the first plurality of nodes represents a first base station of the plurality of base stations, and an edge of the first plurality of edges represents a first neighboring relationship between two base stations of the plurality of base stations, wherein each edge of the first plurality of edges has an associated first weight value; partitioning the first graph into a first set of sub-graphs, wherein the first set of sub-graphs includes k sub-graphs, each having a subset of the first plurality of nodes and a subset of the first plurality of edges, such as to minimize a first sum value of all first weight values associated with each edge of each subset of the first plurality of edges in all sub-graphs of the first set of sub-graphs; calculating a first conflict value based on the first sum value; and initiating a change relating to the operating parameter to one or more base stations in the plurality of base stations if the first conflict value satisfies a condition.

Embodiments of the present disclosure have the benefits of allowing a cellular network operator to objectively evaluate whether a change in an operating parameter would be beneficial based on the first conflict value. The change may be whether the size of the set of operating parameter values should be increased or decreased, or whether the values for a base station of the plurality of base stations should be reselected.

The method may further comprise: partitioning the first graph into a second set of sub-graphs, wherein the second set of sub-graphs includes m sub-graphs, each having a subset of the first plurality of nodes and a subset of the first plurality of edges, such as to minimize a second sum value of the first weight values associated with each edge of each subset of the first plurality of edges in all sub-graphs of the second set of sub-graphs; and calculating a second conflict value based on the second sum value, wherein the initiating a change includes determining whether the set of values for the operational parameter should have k or m values based on the first and second conflict values. Thus, the cellular network operator may determine whether to change the size of an operating parameter set (from k to m) based on their respective conflict values. It may be determined to initiate such a change if the second conflict value satisfies a threshold.

The method may further comprise: defining a second graph comprising a second plurality of nodes and a second plurality of edges, wherein a node of the second plurality of nodes represents a second base station of the plurality of base stations, and an edge of the second plurality of edges represents a second neighboring relationship between two base stations of the plurality of base stations, wherein each edge of the second plurality of edges has an associated second weight value; partitioning the second graph into a third set of sub-graphs, wherein the third set of sub-graphs includes k sub-graphs, each having a subset of the second plurality of nodes and a subset of the second plurality of edges, such as to minimize a third sum value of the second weight values associated with each edge of each subset of the second plurality of edges in all sub-graphs of the third set of sub-graphs; and calculating the first conflict value based on the first and third sum values. Thus, the conflict value may be determined by evaluating a plurality of graphs which each represent a particular conflict (e.g. the first graph representing a PCI collision and the second graph representing a PCI confusion).

The method may further comprise: partitioning the second graph into a fourth set of sub-graphs, wherein the fourth set of sub-graphs includes m values, each having a subset of the second plurality of nodes and a subset of the second plurality of edges, such as to minimize a fourth sum value of the second weight values associated with each edge of each subset of the plurality of edges in all sub-graphs of the fourth set of sub-graphs; and calculating the second conflict value based on the second and fourth sum values. The cellular operator may therefore determine whether or not to initiate a change in the size of an operating parameter set based on a conflict value which is evaluated based on the first and second graphs.

The operational parameter may be a Physical Cell Identifier, PCI, and the set may be a PCI pool. Furthermore, the first weight value may represent a PCI conflict and the second weight value may represent a PCI confusion.

If it is determined that the set should have m values, then the method may further comprise the step of: causing the first base station of the plurality of base stations to reconfigure the operational parameter based on the set of values, wherein the set includes m values.

Determining whether to initiate a change may include determining whether the first base station in the plurality of base stations should reselect its operational parameter based on the first conflict value.

According to a second aspect of the disclosure, there is provided a computer program comprising instructions which, when the program is executed by a computer, cause the computer to carry out the method of the first aspect of the disclosure. The computer program may be provided on a computer readable medium.

According to a third aspect of the present disclosure, there is provided a network node for a cellular telecommunications network, the network node comprising a receiver configured to receive an operational parameter value associated with each base station of a plurality of base stations, wherein the operational parameter values are each one of a set of values; and a processor configured to carry out the method of the first aspect of the disclosure. The network node may be part of a cellular network.

The above summary is not intended to describe each illustrated embodiment or every implementation of the subject matter hereof. The figures and the detailed description that follow more particularly exemplify various embodiments.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS

Figure 1:
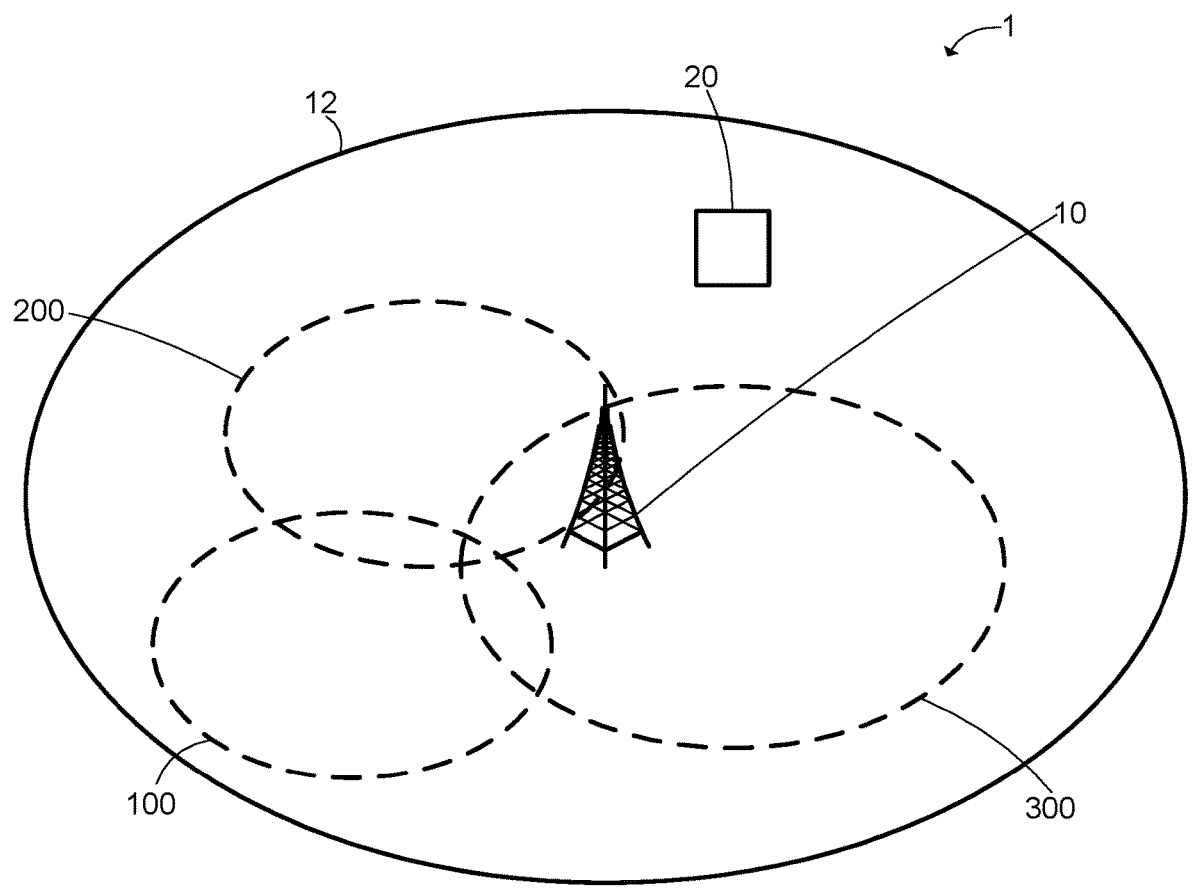
FIG. 1 is a schematic diagram of an embodiment of a cellular telecommunications network of the present disclosure.

An embodiment of a cellular telecommunications network 1 will now be described with reference to FIGS. 1 to 3. The cellular network 1 is a Heterogeneous Network (HetNet) having a macro base station 10 with a coverage area 12 (typically known as a "cell"). The cellular network 1 includes a first, second and third cluster 100, 200, 300 of femto base stations. In this example, the first cluster 100 includes ten femto base stations, the second cluster 200 includes twenty-five femto base stations, and the third cluster 300 includes thirty-five femto base stations. In FIG. 1, an outline of the overall coverage areas of the first, second and third clusters 100, 200, 300 is shown (rather than the coverage area of each femto base station) for simplicity.

FIG. 1 also illustrates a network manager 20 of the cellular network 1, which is connected to the macro base station and each femto base station of the first, second and third cluster. The cellular network 1 further includes several User Equipment (UE) connected to each base station, but these are not shown in FIG. 1 for simplicity.

Figure 2:
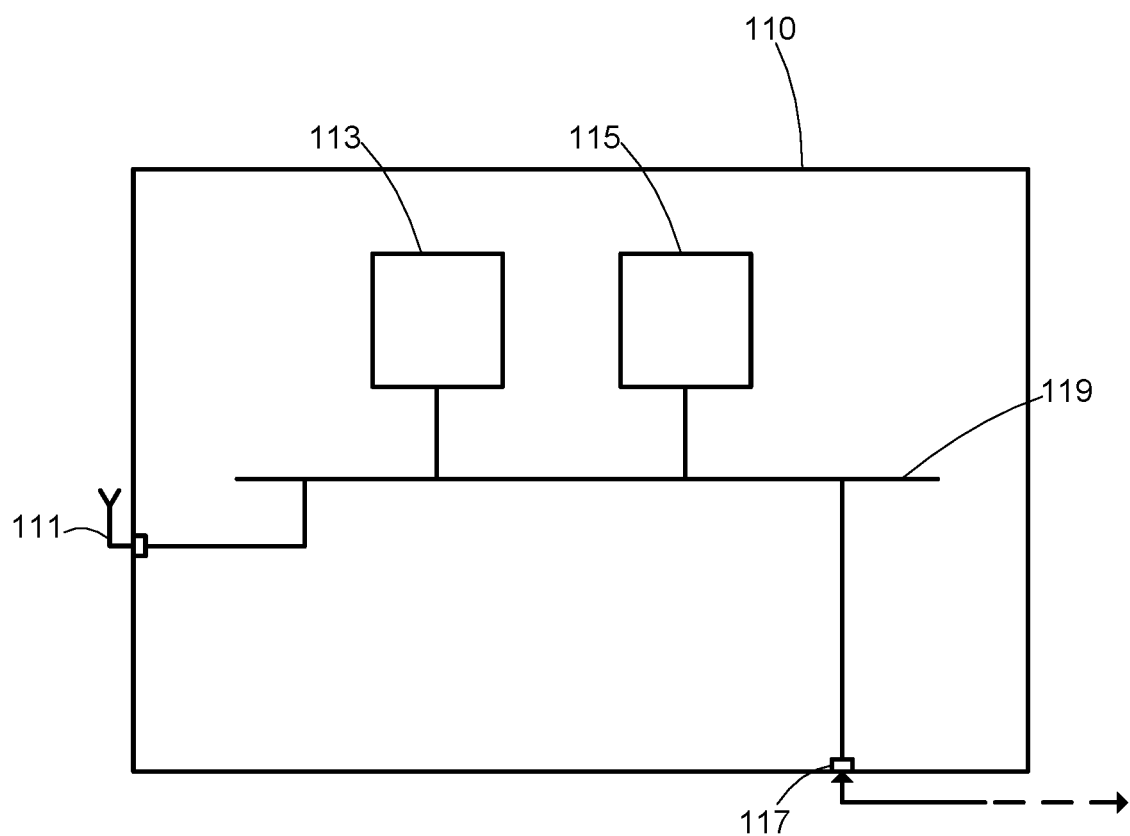
FIG. 2 is a schematic diagram of a base station of the network of FIG. 1.

FIG. 2 illustrates a first femto base station 110 of the first cluster of base stations. The femto base station 110 includes a first transceiver 111, a processor 113, memory 115 and a second transceiver 117, all connected via bus 119. In this embodiment, the first transceiver 111 is an antenna configured for cellular communications according to the $3^{rd}$ Generation Partnership Project (3GPP) Long Term Evolution (LTE) protocol, such that any connected UEs may be provided with voice and data services, which will typically use the processor 113 and memory 115 modules. In this embodiment, the second transceiver 117 is a fiber optic connection to the cellular core network (known as a "backhaul"), such that the femto base station 110 may connect to the network manager 20, packet-data networks (e.g. the Internet), and other core network services.

Several processes of the first femto base station 110 will now be described. As noted in the Background section above, cellular networking protocols (such as LTE) define several operating parameters, each having a set of values, and each base station must use one or more values of each of these sets of values in order to operate in accordance with the protocol. For example, the Physical Cell Identifier (PCI) is an operating parameter which has a set of values between 0 and 503. Each base station must select and use one of these values. In this embodiment, the processor 113 of the first femto base station 110 includes a plurality of Self-Organized Network (SON) algorithms, including one SON algorithm to select the PCI value from the set of PCI values. In a second process, the first femto base station 110 is configured to populate a Neighbor Relations Table, NRT, which identifies nearby base stations and several of their operating parameters, which is stored in memory 115. This may be populated by instructing its connected UEs to search for nearby base stations and prepare measurement reports, or by a Network Listen function in which the first femto base station 110 mimics these UE functions to directly determine the identities and operating parameters of its neighbors (e.g. by the cooperation of the processor 113, first transceiver 111, and memory 115). In this embodiment, the first femto base station 110 is configured to report its selected values of each operating parameter (e.g. PCI) and its NRT to the network manager 20 via the second transceiver 117.

The macro base station 10 and other femto base stations of the first, second and third clusters 100, 200, 300 include the same elements as the first femto base station 110 described above, although there may be differences depending on the deployment scenario (for example, the macro base station 10 will have a greater transmission power such that it may transmit over a greater coverage area, and is more likely to have its operating parameter values selected by the cellular network operator rather than by a SON algorithm).

Figure 3:
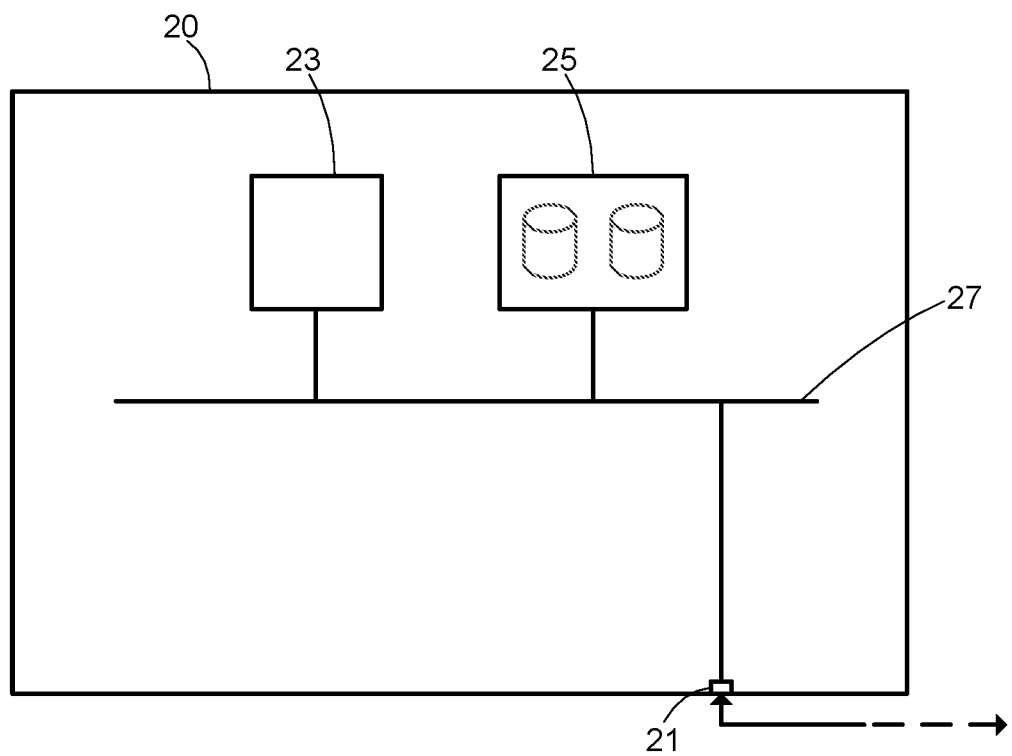
FIG. 3 is a schematic diagram of a network manager of the network of FIG. 1.

FIG. 3 illustrates the network manager 20 in more detail. The network manager 20 includes a first transceiver 21, a processor 23 and memory 25, all connected via bus 27. The first transceiver 21 is an optical fiber connection with each base station of the cellular network 1 and to other cellular core entities. In this embodiment, memory 25 includes a database having several tables, which will now be described. A first table is a base station table, which identifies each base station in the cellular network, their operating parameter values, and the contents of their NRTs (as reported from each base station). A second table is a network table, which identifies certain properties for each operating parameter (such as the subset of values allocated to a cluster, any unallocated values within each cluster, and several operator defined thresholds). The value of this data will become clear upon review of the method of the present disclosure.

Figure 4:
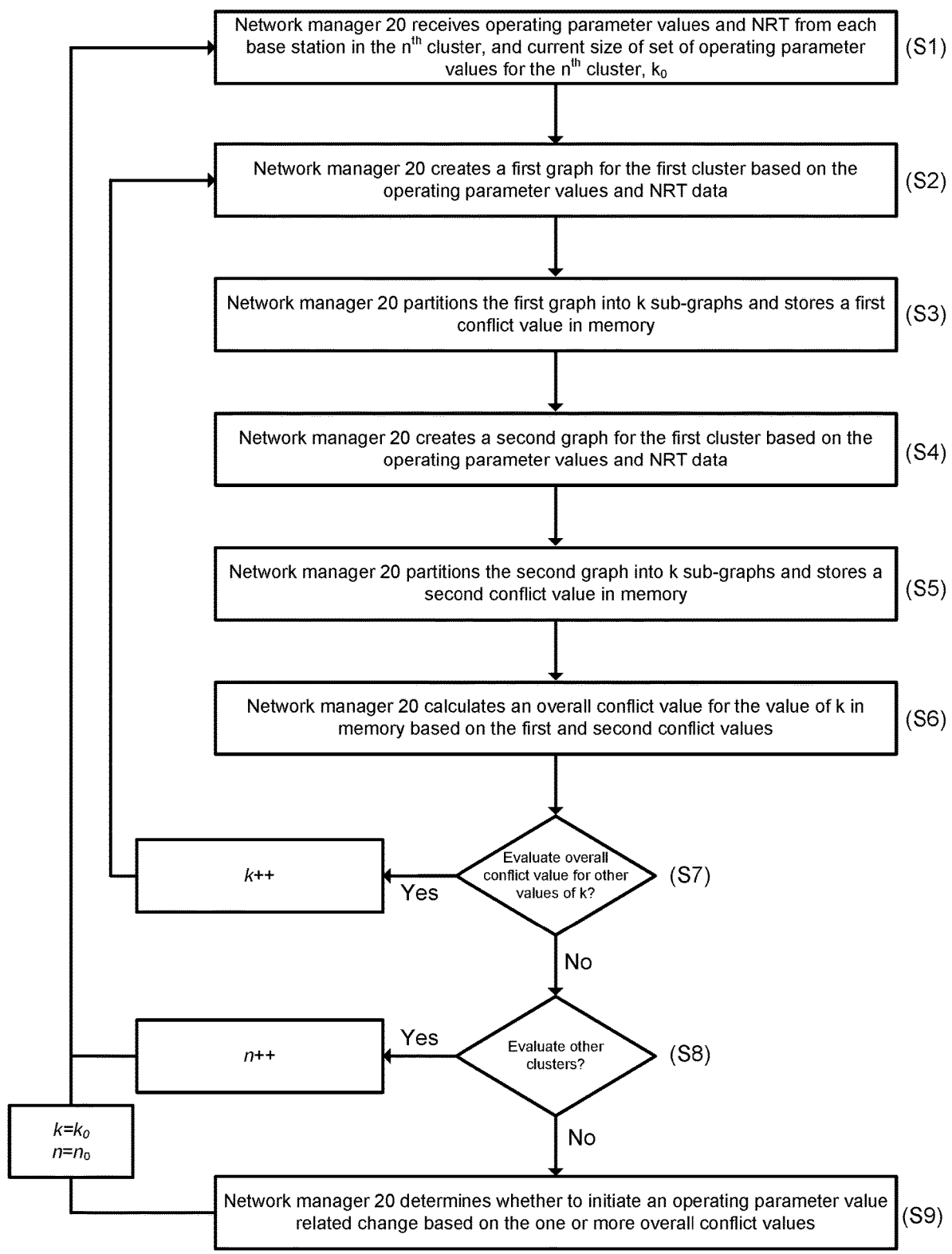
FIG. 4 is a flow diagram of an embodiment of a method of the present disclosure.
Figure 5:
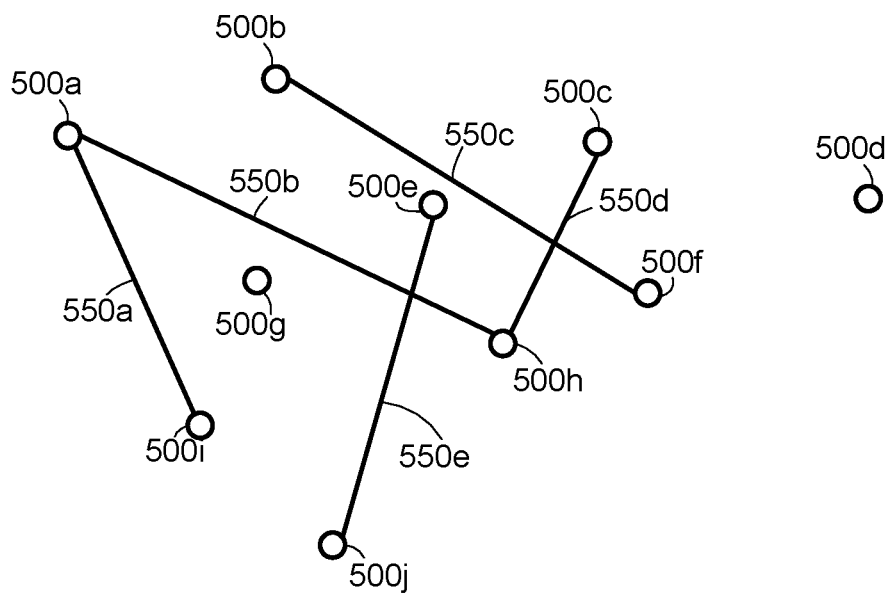
FIG. 5 is a first graph used in the method of FIG. 4.
Figure 6:
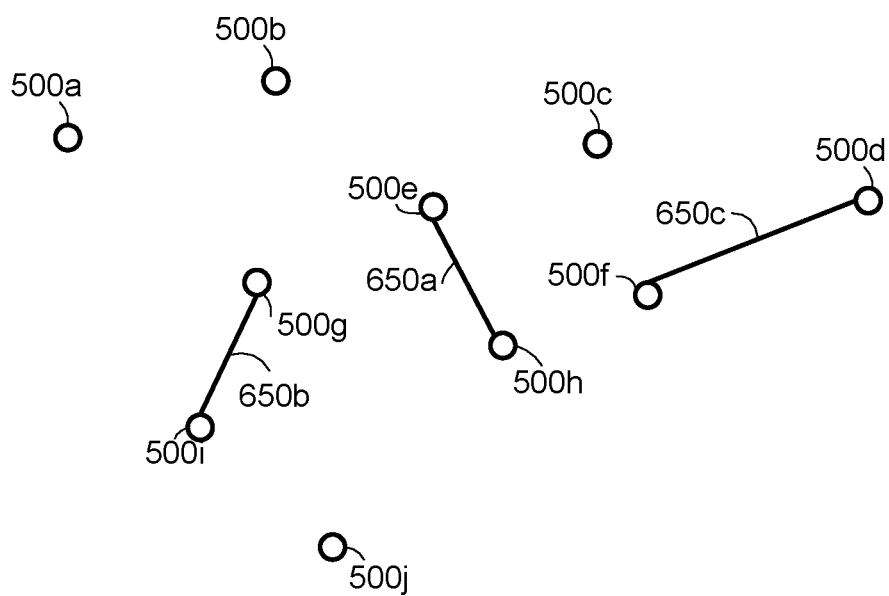
FIG. 6 is a second graph used in the method of FIG. 4.

An embodiment of a method of the present disclosure will now be described, with reference to FIGS. 4 to 6, in which a cellular network operator is optimizing PCI allocations within the cellular network 1. In S1, the network manager 20 receives the PCI for each base station in the cellular network 1 (including the macro base station 10, and each femto base station of the first, second and third cluster 100, 200, 300), and stores these values in memory. The network manager 20 also receives the NRT for each base station in the cellular network 1, which identifies each base station's neighbor, and stores these values in memory. This data allows the network manager 20 to identify any two neighbors which have a direct PCI conflict (that is, two base stations whose respective coverage areas cover the other base station and whose PCI values are the same), any two neighbors which have an indirect conflict (that is, two base stations whose respective coverage areas cover the other base station and whose PCI values are not the same but are known to interfere, such as a mod-3, mod-6 or mod-30 conflict), and any two base stations which have a PCI confusion (that is, two base stations whose PCI values are the same and whose respective coverage areas do not cover each other but cover a common neighboring base station).

In S2, the network manager 20 creates a first graph 500 for the first cluster 100 of base stations in the cellular network 1 based on this data. The first graph 500, as shown in FIG. 5, includes a plurality of nodes $500a \ldots 500j$, which represent all ten femto base stations in the first cluster 100.

The first graph 500 also includes a plurality of edges $550a \ldots 550e$ which each terminate at two of the plurality of nodes $500a \ldots 500j$. In this first graph 500, an edge terminates at two of the plurality of nodes $500a \ldots 500j$ if the two femto base stations represented by those two nodes have a direct or indirect PCI conflict.

In S3, the network manager 20 partitions the first graph 500 into k sub-graphs, wherein k is the size of the PCI pool (e.g. if the PCI pool includes values 0, 10, 12, 13, and 14, then the value of k is 5), such that each sub-graph includes a subset of the plurality of nodes $500a \ldots 500j$ and a subset of the plurality of edges $550a \ldots 550e$ in such a way so as to minimize the following equation:

$$\text{Conflict} = \Sigma_{all\ edges} x_1 y_1 + x_2 y_2 + x_3 y_3 + x_4 y_4 \qquad (1)$$

Where $x_1$ denotes a first edge type in a sub-graph representing a direct PCI conflict and $y_1$ is a first weighting representing an impact on network performance for the first edge type, $x_2$ denotes a second edge type in a sub-graph representing a mod-3 PCI conflict and $y_2$ is a second weighting representing an impact on network performance for the second edge type, $x_3$ denotes a third edge type in a sub-graph representing a mod-6 PCI conflict and $y_3$ is a third weighting representing an impact on network performance for the third edge type, and $x_4$ denotes a fourth edge type in a sub-graph representing a mod-30 PCI conflict and $y_4$ is a fourth weighting representing an impact on network performance for the fourth edge type. These weightings, which are stored in the second table in memory 25, are defined by the cellular network operator and, in this example, are $y_1=1$, $y_2=0.2$, $y_3=0.05$, $y_4=0.05$.

The process of partitioning the first graph 500 into k sub-graphs so as to minimize the total weight of all edges joining nodes in all sub-graphs is known as the "minimum k-partition" problem. There are several techniques that may be used by the network manager 20 to perform this process and, in this embodiment, the network manager 20 uses the Iterative Clustering Heuristic (ICH) technique detailed in "A branch-and-cut algorithm based on semidefinite programming for the minimum k-partition problem" (Ghaddar, B., Anjos, M. F. & Liers, F. Ann Oper Res (2011) 188: 155. doi:10.1007/s10479-008-0481-4), although as an alternative the network manager 20 may also use the technique detailed in "Semidefinite relaxations for partitioning, assignment and ordering problems" (Rendl, F. Ann Oper Res (2016) 240: 119. doi:10.1007/s10479-015-2015-1). These articles are hereby incorporated by reference in their entirety. For completeness, the ICH technique will now be summarized.

Given a graph G(V,E) with n vertices, weights $w_{ij}$ between vertices i and j, and number of partitions k, and the following Semidefinite Programming (SDP) relaxation:

$$\min \sum\nolimits_{i,j \in V, i<j} w_{i,j} \frac{(k-1)X_{ij}+1}{k} \qquad (2)$$

$$\text{s.t. } X_{ii} = 1 \quad \forall\, i \in V \qquad (3)$$

$$X_{ij} \geq \frac{-1}{k-1} \quad \forall\, i, j \in V, i<j \qquad (4)$$

$$X \succcurlyeq 0 \qquad (5)$$

Then the heuristic is described in the following algorithm:
1. Initialize a parameter r, the current number of partitions, to zero;
2. Initialize a parameter m, the current number of nodes, to n;

3. Initialize a tolerance tol, for example, tol=1.7;
4. Solve the SDP relaxation (equations 2 to 5) with m nodes and get the optimal solution X*;
5. Take each triplet of vertices i, j, and h and sum the values on their edges: $T_{ijh}X'_{ij}+X'_{ih}+X'_{jh}$
6. Sort the values of $T_{ijh}$
7. (a) Choose vertices i, j, and h with $T_{ijh} \geq$ tol to be in the same partition
   (b) If any vertices remain unassigned to a partition, choose vertices with $T_{ijh} \leq$ tol to be in separate partitions
   (c) Update r to be the number of current partitions
8. If r>k,
   (a) Aggregate the vertices that are in the same partition into a single vertex. Call these new vertices 1', 2', ..., r'.
   (b) Set m=r and create the new aggregate weight matrix with entries $\overline{w}_{i'j'} = \Sigma_{i \in i', j \in j'} w_{ij}$
   (c) Return to step 4.
9. End It is noted that equation (5) means that the matrix X is required to be positive semi definite, or in other words the scalar value $v^T X v$ is non-negative for any vector v. Furthermore, SDP programs can be solved using known software such as DSDP (https://neos-server.org/neos/solvers/sdp:DSDP/SDPA.html) or cvxpy (http://www.cvxpy.org/en/latest/).

Following S3, the network manager 20 stores the PCI conflict value (being the value of the sum of equation 1) in memory 25.

In S4, the network manager 20 creates a second graph 600 for the first cluster 100 of base stations in the cellular network based on the data stored in memory 25. As shown in FIG. 6, the second graph 600 also includes the plurality of nodes 500a . . . 500j, which represent all ten femto base stations in the first cluster 100. The second graph 600 also includes a plurality of edges 650a . . . 650c which each terminate at two of the plurality of nodes 500a . . . 500j. In the second graph 600, an edge terminates at two of the plurality of nodes 500a . . . 500j if the two femto base stations represented by those two nodes have a PCI confusion.

In S5, the network manager 20 partitions the second graph 600 into k sub-graphs, wherein k is again the size of the PCI pool, such that each sub-graph includes a subset of the plurality of nodes 500a . . . 500j and a subset of the plurality of edges 650a . . . 650b in order to minimize the following equation:

$$\text{Conflict} = \Sigma_{all\ edges} x_5 y_5 \quad (6)$$

Where $x_5$ denotes a fifth edge type in a sub-graph representing a PCI confusion and $y_5$ is a first weighting representing an impact on network performance for the fifth edge type. The fifth weighting is again stored in the second table in memory 25, is defined by the cellular network operator, and in this example takes the value 0.25. The process of partitioning the second graph 600 into k sub-graphs so as to minimize the weight of the edges joining nodes in all sub-graphs is again performed using the technique referred to above. Following this, the network manager 20 stores the PCI confusion conflict value (being the value of the sum of equation 6) in memory 25. In S6, the PCI conflict and PCI confusion values are summed to create an overall PCI conflict value based on the current PCI pool size.

In S7, the network manager 20 re-evaluates equations (1) and (6) for a plurality of alternative PCI pool sizes. In this example, the alternative PCI pool sizes, $m_1 \ldots m_4$, are 3, 4, 6 and 7, such that the first and second graphs are each partitioned into $m_1 \ldots m_4$ sub-graphs so as to minimize the total weight of the edges joining nodes in all sub-graphs. The overall PCI conflict value for each of the plurality of alternative PCI pool sizes are then stored in memory 25.

In S8, the network manager 20 determines if there are any other clusters in the cellular network 1 which need to be evaluated. In this example, the network manager 20 determines that the second and third clusters 200, 300 should also be evaluated, and the method loops back to S2 and evaluates the overall PCI conflict values for the current PCI pool size and a plurality of alternative PCI pool sizes for the second and third clusters 200, 300. These values are stored in memory 25.

Once the network manager 20 has evaluated these overall PCI conflict values for all PCI pool sizes for each cluster 100, 200, 300, the method proceeds to S9, in which the network manager 20 determines whether to initiate a PCI value related change in any one of the clusters 100, 200, 300 in the cellular network 1 based on the overall PCI conflict values and the data stored in the network table in memory 25 (such as the cellular network operator's thresholds). Several examples will now be discussed.

In a first example, the network manager 20 compares the overall PCI conflict values for the current PCI pool size and the plurality of alternative PCI pool sizes for the first, second and third clusters 100, 200, 300 to a threshold (representing the cellular network operator's acceptable level of conflict). In doing so, the network manager 20 determines that the first cluster's current PCI pool size is not acceptable (as the overall PCI conflict value of the current PCI pool size is greater than the threshold), and the second and third cluster's current PCI pool size is acceptable (as the overall PCI conflict value of the current PCI pool size is less than the threshold). The network manager 20 also determines that an alternative PCI pool size for the first cluster 100 to increase the PCI pool size by one value would lead to an overall PCI conflict value that would be less than the threshold. Accordingly, it is determined that a change in PCI pool size for the first cluster to increase its PCI pool size by one value is beneficial.

In this example, the network manager 20 further determines whether such a change should be implemented based on data relating to the cellular network and the overall PCI conflict values of the other clusters. Accordingly, the network manager 20 determines (from the network table stored in memory 25), whether there are any unallocated PCI values in the cellular network that may be allocated to the first cluster 100. In this example, there are no such unallocated values. The network manager 20 therefore determines whether any of the alternative PCI pool sizes for the second and third clusters 200, 300 that have fewer PCI values than the current PCI pool sizes for those clusters would be acceptable (i.e. if the overall PCI conflict value of those alternative PCI pool sizes are also less than the threshold). In this example, the network manager 20 determines that the second cluster 200 may reduce its PCI pool size by one value, and reallocate that PCI value to the first cluster 100. The network manager 20 may then instruct each femto base station in the first and second clusters 100, 200 that their PCI pool sizes have changed and, if necessary, they should perform a PCI reselection operation.

Thus, in general terms, the network manager 20 is able to evaluate the optimum PCI pool size for each cluster in the cellular network 1 (being the smallest PCI pool size that satisfies a threshold representing an acceptable level of conflict as defined by the cellular network operator), and initiate a change in the relevant clusters such that each base station in the cluster adopts the optimum PCI pool size.

In a further enhancement of the above first example, the network manager 20 is also able to determine (following a determination that the current PCI pool size of one or more clusters is not the optimum PCI pool size) whether or not to initiate a change in those one or more clusters. This decision may be based on an evaluation of the level of service disruption to each UE connected to each femto base station in those one or more clusters as the PCI values are reselected to be within the new PCI pool size. This may be based on the number of active sessions associated with all femto base station in those clusters, the proportion of UEs of all femto base stations in those clusters in idle mode, the time of day, the settling time for PCI reselection algorithms, etc. Following this decision, the network manager 20 may then initiate a change in the manner described above, or may instead loop back to S1.

In the above embodiments, the network manager determines whether or not a particular operating parameter pool size is acceptable or not by comparison to a threshold. These thresholds may be set by the network operator by calibration and may be varied according to their policy on acceptability on operating parameter conflict. Furthermore, these thresholds may include several components, such that a PCI conflict threshold may include a direct PCI conflict threshold, a mod-3 PCI conflict threshold, etc., and the cellular network operator may define a PCI conflict value as acceptable or not based on one or more of these thresholds.

Furthermore, the skilled person will understand that the weightings used for each edge type may be set by the network operator by calibration and are representative of the network operator's perceived impact on network performance of a particular conflict. In particular, these weightings may be based on the number of cellular network operators that exist in a particular cluster, the level of conflict between those operators' SON algorithms, the level of synchronization between base stations in the cluster, the level of overlap of coverage areas between base stations in the cluster (based on measured pathloss), etc.

In the above embodiments, the method is performed in a network manager which is configured to receive the relevant data from each base station in the network. However, the skilled person will understand many other nodes in the network may be configured to receive this data and perform the above method. For example, a base station may be configured to receive the data (e.g. over an X2 interface), and perform the above method.

Furthermore, the skilled person will understand that the above embodiments use the PCI as the operating parameter as an example only, and that the present disclosure may be applied to other operating parameters which have a defined set of values (such as ICIC resource assignment, transmission power, etc.). For example, the network manager may build a graph having a plurality of nodes representing base stations in a cluster and a plurality of edges representing ICIC color conflict between any two nodes of the plurality of nodes. The weighting for these edges may then be based the operator's perceived impact on network performance from such color conflict, which may be based on the types of color selection SON algorithms, the level of color-selection SON coordination, the operator's policy on edge user experience versus peak rate, form of fractional frequency reuse, etc.

In the above embodiments, a cluster was a group of base stations that were assigned a particular subset of the set of operating parameter values, wherein the grouping was based on those base stations' locations. However, the skilled person will understand that this form of grouping is non-essential and may instead be based on other characteristics, such as the base station's operator, or the transmission range of the base station.

The skilled person will also understand that the embodiments of the present disclosure may be utilized by a cellular network operator on initial network configuration or for ongoing optimization.

The skilled person will understand that any combination of features is permissible within the scope of the disclosure, as claimed.

The invention claimed is:

1. A method of operating a cellular telecommunications network comprising a plurality of base stations, wherein each of the plurality of base stations has an operational parameter being one of a set of values, wherein the set includes k values, the method comprising:
   defining a first graph comprising a first plurality of nodes and a first plurality of edges, wherein a node of the first plurality of nodes represents a first base station of the plurality of base stations, and an edge of the first plurality of edges represents a first neighboring relationship between two base stations of the plurality of base stations, wherein each edge of the first plurality of edges has an associated first weight value;
   partitioning the first graph into a first set of sub-graphs, wherein the first set of sub-graphs includes k sub-graphs, each having a subset of the first plurality of nodes and a subset of the first plurality of edges, such as to minimize a first sum value of all first weight values associated with each edge of each subset of the first plurality of edges in all sub-graphs of the first set of sub-graphs;
   calculating a first conflict value based on the first sum value; and
   initiating a change relating to the operational parameter to one or more base stations in the plurality of base stations if the first conflict value satisfies a condition.

2. A method as claimed in claim 1, further comprising:
   partitioning the first graph into a second set of sub-graphs, wherein the second set of sub-graphs includes m sub-graphs, each having a subset of the first plurality of nodes and a subset of the first plurality of edges, such as to minimize a second sum value of the first weight values associated with each edge of each subset of the first plurality of edges in all sub-graphs of the second set of sub-graphs; and
   calculating a second conflict value based on the second sum value,
   wherein the initiating a change includes determining whether the set of values for the operational parameter should have k or m values based on the first and second conflict values.

3. A method as claimed in claim 2, wherein the initiating a change includes determining whether the set of values for the operational parameter should have k or m values based on the first and second conflict values and on whether the second conflict value satisfies a threshold.

4. A method as claimed in claim 2, further comprising:
   defining a second graph comprising a second plurality of nodes and a second plurality of edges, wherein a node of the second plurality of nodes represents a second base station of the plurality of base stations, and an edge of the second plurality of edges represents a second neighboring relationship between two base stations of the plurality of base stations, wherein each edge of the second plurality of edges has an associated second weight value;

partitioning the second graph into a third set of sub-graphs, wherein the third set of sub-graphs includes k sub-graphs, each having a subset of the second plurality of nodes and a subset of the second plurality of edges, such as to minimize a third sum value of the second weight values associated with each edge of each subset of the second plurality of edges in all sub-graphs of the third set of sub-graphs; and calculating the first conflict value based on the first and third sum values.

5. A method as claimed in claim 4, further comprising:
partitioning the second graph into a fourth set of sub-graphs, wherein the fourth set of sub-graphs includes m values, each having a subset of the second plurality of nodes and a subset of the second plurality of edges, such as to minimize a fourth sum value of the second weight values associated with each edge of each subset of the plurality of edges in all sub-graphs of the fourth set of sub-graphs; and calculating the second conflict value based on the second and fourth sum values.

6. A method as claimed in claim 4, wherein the operational parameter is a Physical Cell Identifier (PCI) and the set is a PCI pool.

7. A method as claimed in claim 6, wherein the first weight value represents a PCI conflict and the second weight value represents a PCI confusion.

8. A method as claimed in claim 2, wherein, if it is determined that the set of values for the operating parameter should have m values, then the method further comprises:
causing the first base station of the plurality of base stations to reconfigure the operational parameter based on the set of values, wherein the set includes m values.

9. A method as claimed in claim 1, wherein the initiating a change includes determining whether the first base station in the plurality of base stations should reselect its operational parameter based on the first conflict value.

10. A method as claimed in claim 1, wherein the first weight value represents a coverage area overlap between the two base stations of the plurality of base stations.

11. A non-transitory computer-readable storage medium storing a computer program comprising instructions which, when the program is executed by a computer, cause the computer to carry out the method of claim 1.

12. A network node for a cellular telecommunications network, the network node comprising:
a receiver configured to receive an operational parameter value associated with each base station of a plurality of base stations, wherein the operational parameter values are each one of a set of values; and
a processor configured to:
define a first graph comprising a first plurality of nodes and a first plurality of edges, wherein a node of the first plurality of nodes represents a first base station of a plurality of base stations, and an edge of the first plurality of edges represents a first neighboring relationship between two base stations of the plurality of base stations, wherein each edge of the first plurality of edges has an associated first weight value;
partitioning the first graph into a first set of sub-graphs, wherein the first set of sub-graphs includes k sub-graphs, each having a subset of the first plurality of nodes and a subset of the first plurality of edges, such as to minimize a first sum value of all first weight values associated with each edge of each subset of the first plurality of edges in all sub-graphs of the first set of sub-graphs;
calculating a first conflict value based on the first sum value; and
initiating a change relating to an operational parameter to one or more base stations in the plurality of base stations if the first conflict value satisfies a condition, wherein the operational parameter is one of a set of values, wherein the set includes k values.

13. A cellular network comprising the network node of claim 12.

* * * * *